(12) United States Patent
Leyendecker et al.

(10) Patent No.: US 11,327,916 B1
(45) Date of Patent: May 10, 2022

(54) ENUMERATING LOGICAL IDENTIFIERS FOR BACKPLANES OF AN INFORMATION HANDLING SYSTEM

(71) Applicant: Dell Products L.P., Round Rock, TX (US)

(72) Inventors: Robert R. Leyendecker, Austin, TX (US); Kurt W. Shetler, Round Rock, TX (US); Rui An, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/238,491

(22) Filed: Apr. 23, 2021

(51) Int. Cl.
*G06F 13/40* (2006.01)

(52) U.S. Cl.
CPC .................. *G06F 13/4068* (2013.01)

(58) Field of Classification Search
None
See application file for complete search history.

(56) References Cited

U.S. PATENT DOCUMENTS

| 6,044,411 A * | 3/2000 | Berglund | G06F 11/2289 710/10 |
| 2012/0159029 A1 * | 6/2012 | Krishnan | G06F 3/0658 710/301 |

* cited by examiner

*Primary Examiner* — Idriss N Alrobaye
*Assistant Examiner* — Dayton Lewis-Taylor
(74) *Attorney, Agent, or Firm* — Baker Botts L.L.P.

(57) ABSTRACT

In one embodiment, a method for enumerating logical identifiers for a plurality of backplanes of an information handling system includes: generating, by each of the plurality of backplanes, inventory information indicating a plurality of backplane attributes; sending, by each of the plurality of backplanes, the inventory information to a baseboard management controller; receiving, by the baseboard management controller, the inventory information from each of the plurality of backplanes; determining, by the baseboard management controller, a backplane topology of the information handling system based on the inventory information, the backplane topology indicating a backplane location for each of the plurality of backplanes; generating, by the baseboard management controller, a logical backplane identifier for each of the plurality of backplanes based on the backplane topology; and assigning, by the baseboard management controller, the logical backplane identifier to each of the plurality of backplanes.

11 Claims, 4 Drawing Sheets

ENUMERATING LOGICAL IDENTIFIERS FOR BACKPLANES OF AN INFORMATION HANDLING SYSTEM

BACKGROUND

Field of the Disclosure

The disclosure relates generally to information handling systems, and in particular to enumerating logical identifiers for backplanes of an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one embodiment, a method for enumerating logical identifiers for a plurality of backplanes of an information handling system includes: generating, by each of the plurality of backplanes, inventory information indicating a plurality of backplane attributes; sending, by each of the plurality of backplanes, the inventory information to a baseboard management controller (BMC) of the information handling system; receiving, by the BMC, the inventory information from each of the plurality of backplanes; determining, by the BMC, a backplane topology of the information handling system based on the inventory information, the backplane topology indicating a backplane location within the information handling system for each of the plurality of backplanes; generating, by the BMC, a logical backplane identifier for each of the plurality of backplanes based on the backplane topology; and assigning, by the BMC, the logical backplane identifier to each of the plurality of backplanes, each of the plurality of backplanes having a logical backplane identifier.

In one or more of the disclosed embodiments, generating the inventory information includes: sampling, by a backplane of the plurality of backplanes, a voltage associated with one or more components of the backplane; determining, by the backplane, a unique voltage profile for the backplane based on the voltage; and indicating, by the backplane, the unique voltage profile for the backplane in the inventory information.

In one or more of the disclosed embodiments, the method further includes: mapping, by the backplane, the unique voltage profile for the backplane to the backplane location; and indicating, by the backplane, the backplane location in the inventory information.

In one or more of the disclosed embodiments, determining the backplane topology of the information handling system based on the inventory information includes: mapping, by the BMC and for each of the plurality of backplanes, the unique voltage profile for the backplane to the backplane location.

In one or more of the disclosed embodiments, generating the inventory information includes: sampling, by a backplane of the plurality of backplanes, a voltage associated with one or more cables communicably coupled to the backplane; determining, by the backplane, a unique cable configuration for the backplane based on the voltage; and indicating, by the backplane, the unique cable configuration for the backplane in the inventory information.

In one or more of the disclosed embodiments, determining the backplane topology of the information handling system based on the inventory information includes: mapping, by the BMC and for each of the plurality of backplanes, the unique cable configuration for the backplane to the backplane location.

In one or more of the disclosed embodiments, the method further includes: determining, by the BMC, a drive slot topology for each of the plurality of backplanes based on the inventory information, the drive slot topology indicating a plurality of drive slot locations for each of the plurality of backplanes; generating, by the BMC, a logical drive slot identifier for each of the plurality of drive slots based on the drive slot topology; and assigning, by the BMC, the logical drive slot identifier to each of the plurality of drive slots, each of the plurality of drive slots having a logical drive slot identifier.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

Figure 1:
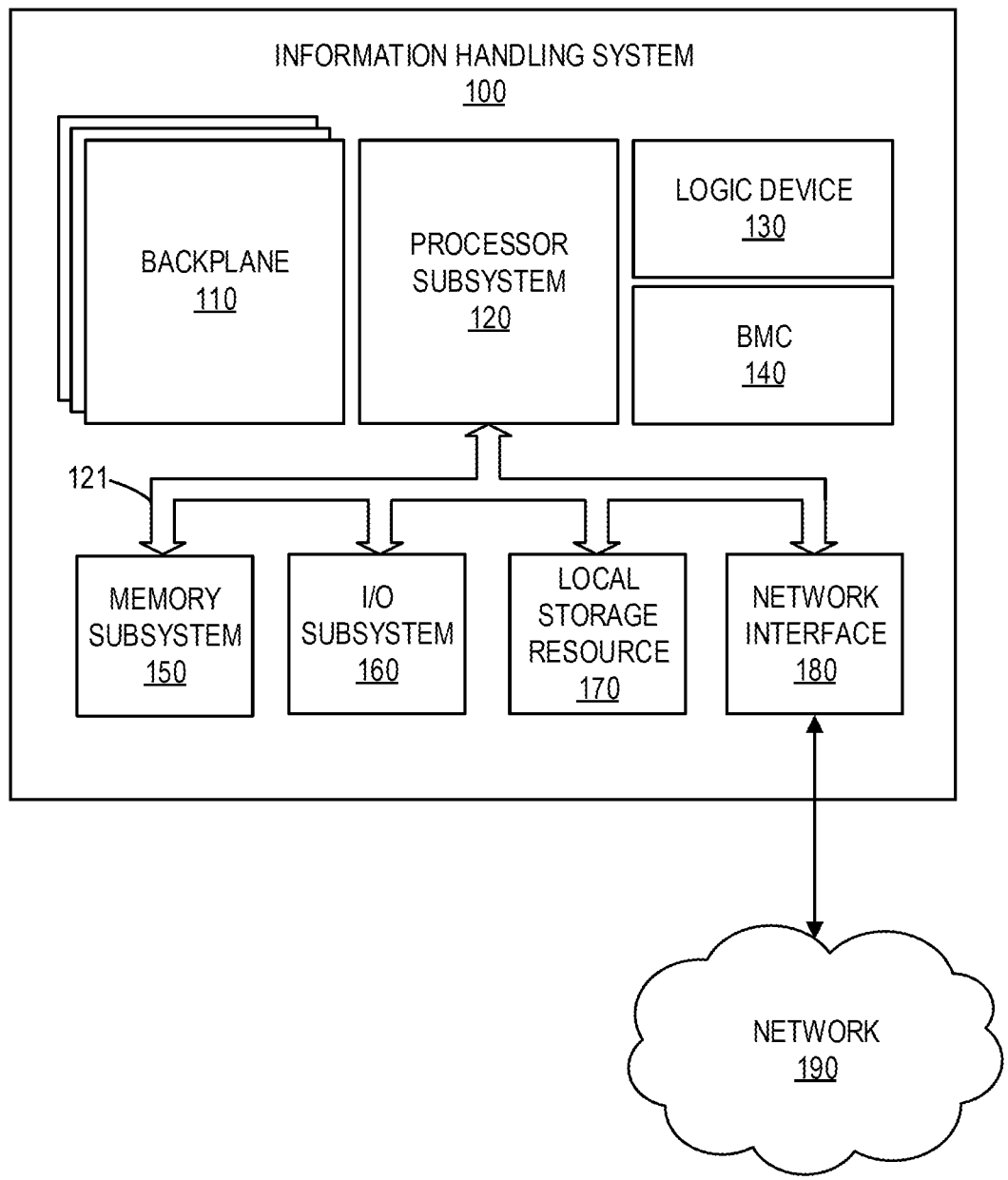
FIG. 1 is a block diagram of selected elements of an embodiment of a computing environment that includes an information handling system.

This document describes a method for enumerating logical identifiers for a plurality of backplanes of an information handling system that includes: generating, by each of the plurality of backplanes, inventory information indicating a plurality of backplane attributes; sending, by each of the plurality of backplanes, the inventory information to a baseboard management controller (BMC) of the information handling system; receiving, by the BMC, the inventory information from each of the plurality of backplanes; determining, by the BMC, a backplane topology of the information handling system based on the inventory information, the backplane topology indicating a backplane location within the information handling system for each of the plurality of backplanes; generating, by the BMC, a logical backplane identifier for each of the plurality of backplanes based on the backplane topology; and assigning, by the BMC, the logical backplane identifier to each of the plurality of backplanes, each of the plurality of backplanes having a logical backplane identifier.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-4 wherein like numbers are used to indicate like and corresponding parts.

Turning now to the drawings, FIG. 1 is a block diagram of selected elements of an embodiment of a computing environment that includes an information handling system. Specifically, FIG. 1 illustrates a block diagram depicting selected elements of an information handling system 100 in accordance with some embodiments of the present disclosure. In other embodiments, information handling system 100 may represent different types of portable information handling systems, such as, display devices, head mounted displays, head mount display systems, smart phones, tablet computers, notebook computers, media players, foldable display systems, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems.

In the embodiment illustrated in FIG. 1, components of information handling system 100 may include, but are not limited to, a processor subsystem 120, which may comprise one or more processors, and system bus 121 that communicatively couples various system components to processor subsystem 120 including, for example, a memory subsystem 150, an I/O subsystem 160, a local storage resource 170, and a network interface 180. In one embodiment, the processor subsystem 120, memory subsystem 150, I/O subsystem 160, local storage resource 170, and a network interface 180 may comprise a motherboard, or "planar," of information handling system 100 (e.g., planar 300 shown in FIG. 3). System bus 121 may represent a variety of suitable types of bus structures (e.g., a memory bus, a peripheral bus, or a local bus) using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus. As shown in FIG. 1, information handling system 100 may additionally include one or more backplanes 110, a logic device 130, and a baseboard management controller (BMC) 140. In other embodiments, computing environment 195 may include additional, fewer, and/or different components than the components shown in FIG. 1.

In information handling system 100, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 150 and/or another component of information handling system 100). In the same or alternative embodiments, processor subsystem 120 may interpret and/or execute program instructions and/or process data stored remotely. In one embodiment, processor subsystem 120 may be or include a multi-core processor comprised of one or more processing cores disposed upon an integrated circuit (IC) chip. In other embodiments, processor subsystem 120 may be or include an integrated device (e.g., microcontroller, system on a chip (SoC), and the like) that includes memory, peripheral interfaces, and/or other components suitable for interpreting and/or executing program instructions and/or processing data.

In one embodiment, memory subsystem 150 may comprise a system, device, or apparatus operable to retain and/or retrieve program instructions and/or data for a period of time (e.g., computer-readable media). Memory subsystem 150 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In one embodiment, I/O subsystem 160 may comprise a system, device, or apparatus generally operable to receive and/or transmit data to, from, and/or within information handling system 100. I/O subsystem 160 may represent, for example, a variety of communication interfaces, graphics interfaces, video interfaces, user input interfaces, and/or peripheral interfaces. In various embodiments, I/O subsystem 160 may be used to support various peripheral devices, such as a touch panel, a display adapter, a keyboard, an accelerometer, a touch pad, a gyroscope, an IR sensor, a microphone, a sensor, a camera, or another type of peripheral device.

In one embodiment, local storage resource 170 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data.

In one embodiment, network interface 180 may be a suitable system, apparatus, or device operable to serve as an interface between information handling system 100 and a network 190. Network interface 180 may enable information handling system 100 to communicate over network 190 using a suitable transmission protocol and/or standard, including, but not limited to, transmission protocols and/or standards enumerated below with respect to the discussion of network 190. Network 190 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 180 may enable wired and/or wireless communications (e.g., NFC or Bluetooth) to and/or from information handling system 100.

In particular embodiments, network 190 may include one or more routers for routing data between client information handling systems 100 and server information handling systems 100. A device (e.g., a client information handling system 100 or a server information handling system 100) on network 190 may be addressed by a corresponding network address including, for example, an Internet protocol (IP) address, an Internet name, a Windows Internet name service (WINS) name, a domain name or other system name. In particular embodiments, network 190 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

In one embodiment, network 190 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 190 and its various components may be implemented using hardware, software, or any combination thereof.

In one embodiment, each backplane 110 may comprise a system, device, or apparatus operable to communicably couple one or more components of information handling system 100. In particular, each backplane 110 (collectively referred to herein as "backplanes 110") may be or include an electronic hardware device configured to provide a support structure for one or more hardware devices (e.g., printed circuit boards, storage devices, and the like) of information handling system 100. In one embodiment, backplane 110 may be or include an active backplane that includes logical components (e.g., microprocessor, microcontroller, memory, and the like) used to process, buffer, and/or store various signals sent to and/or from hardware devices disposed, or otherwise installed, upon backplane 110. In this embodiment, backplane 110 may include firmware instructions used by the logical components to process, buffer, and/or store the various signals sent to and/or from hardware devices communicably coupled to one another via one or more connectors, or "drive slots," of backplane 110 (e.g., drive slots 320-A through 320-C shown in FIG. 3). In another embodiment, backplane 110 may be or include a passive backplane that does not include logical components used to process, buffer, and/or store various signals sent to and/or from hardware devices disposed, or otherwise installed, upon backplane 110.

In one embodiment, each backplane 110 disposed throughout information handling system 100 may be associated with a one or more unique numeric values, or "logical identifiers." In particular, each backplane 110 disposed throughout information handling system 100 may be assigned a unique numeric value, or a "logical backplane identifier." In one embodiment, each logical backplane identifier assigned to backplanes 110 may correspond to a location of backplane 110 within information handling system 100 (e.g., within a chassis of information handling system 100) and/or position of backplane 110 with respect to one or more adjacent backplanes 110. For example, each logical backplane identifier may be or include a backplane bay number that sequentially increments, or decrements, in numeric value for respective backplanes 110 within a front chassis of information handling system 100. Here, each backplane 110 may be identified and/or addressed by one or more components of information handling system 100 using the logical backplane identifier that corresponds to the backplane 110. Similarly, each drive slot of backplane 110 may be assigned a unique numeric value, or a "logical drive slot identifier." In one embodiment, each logical drive slot identifier assigned to drive slots disposed upon backplane 110 may correspond to respective locations of drive slots within backplane 110 and/or positions of drive slots within one or more adjacent backplanes 110. For example, each logical drive slot identifier may be or include a drive slot number that sequentially increments, or decrements, in numeric value for respective drive slots within backplane 110 and/or in relation to positions of drive slots within an adjacent backplane 110 installed within the same chassis. Here, each drive slot disposed upon backplane 110 may be identified and/or addressed by one or more components of information handling system 100 using the logical drive slot identifier that corresponds to the drive slot. Backplane 110 is described in further detail with respect to FIGS. 2 and 3.

In one embodiment, logic device 130 may comprise a system, device, or apparatus operable to store logical identifiers associated with backplanes 110. In particular, logic device 130 may be or include an electronic hardware device operable to store logical backplane identifiers and/or logical drive slot identifiers. In one embodiment, logic device 130 may be or include a shared memory device used to store logical backplane identifiers and/or logical drive slot identifiers generated by BMC 140. In this embodiment, logic device 130 may receive logical backplane identifiers and/or logical drive slot identifiers from BMC 140 and may store the logical identifiers accordingly. Once stored, BMC 140 may set a flag in logic device 130 indicating to backplanes 110 that the logical backplane identifiers and/or logical drive slot identifiers have been stored in logic device 130 and are ready to be retrieved. In response, backplanes 110 may identify the flag set in logic device 130 and may retrieve the logical backplane identifiers and/or logical drive slot identifiers from logic device 130 accordingly. In addition, logic device 130 may provide the logical identifiers to one or more components of information handling system 100 (e.g., system BIOS, CPU, storage controller, and the like) such that the logical identifiers may be used by the one or more components to identify and/or address the respective backplanes 110 and/or drive slots. For instances in which backplanes 110 undergo a reset (e.g., due to an internal error), backplanes 110 may simply retrieve the logical backplane identifiers and/or logical drive slot identifiers from logic device 130 upon powerup.

In one embodiment, logic device 130 may be or include a programmable logic device. For example, logic device 130 may be or include a complex programmable logic device (CPLD) comprised of logic arrays and macrocells operable to perform one or more logic operations. In another embodiment, logic device 130 may be or include a microcontroller. For example, logic device 130 may be or include an 8051 microcontroller, an ARM Cortex-M (e.g., Cortex-M0, Cortex-M1, Cortex-M3, Cortex-M4, Cortex-M7, and the like) microcontroller, a MSP430 microcontroller, an AVR (e.g., 8-bit AVR, AVR-32, and the like) microcontroller, a PIC microcontroller, a 68HC11 microcontroller, a ColdFire microcontroller, a Renesas microcontroller, etc. In other embodiments, logic device 130 may be or include an application processor, a field programmable gate array (FPGA), ASIC, and/or any integrated circuit suitable for electronically storing logical identifiers associated with backplanes 110 and/or drive slots of backplanes 110. Logic device 130 is described in further detail with respect to FIGS. 2 and 3.

In one embodiment, BMC 140 may comprise a system, device, or apparatus operable to generate logical identifiers associated with backplanes 110. In particular, BMC 140 may be or include an electronic hardware device operable to generate logical backplane identifiers and/or logical drive slot identifiers. In one embodiment, BMC 140 may store firmware instructions used to generate logical backplane identifiers and/or logical drive slot identifiers. In this embodiment, BMC 140 may execute the firmware instructions to generate logical backplane identifiers and/or logical drive slot identifiers and to assign the logical identifiers to respective backplanes 110 and/or drive slots accordingly. Additionally, BMC 140 may provide the logical identifiers to one or more components of information handling system 100 (e.g., logic device 130) such that the logical identifiers may be used by the one or more components to identify and/or address the respective backplanes 110 and/or drive slots. In one embodiment, BMC 140 may additionally include circuitry (e.g., processor, memory, network interface, and the like) that allows BMC 140 to communicate with one or more additional information handling systems and/or an administrator, or administrators, of computing environment 195 via network 190. For example, BMC 140 may notify an administrator of computing environment 195 via network 190 of the logical identifiers such that the logical identifiers may be used by the administrator to identify and/or address the respective backplanes 110 and/or drive slots. In this example, BMC 140 may additionally notify one or more microservices and/or update a graphical user interface (GUI) via network 190 to include the logical identifiers. BMC 140 is described in further detail with respect to FIGS. 2 and 3.

Figure 2:
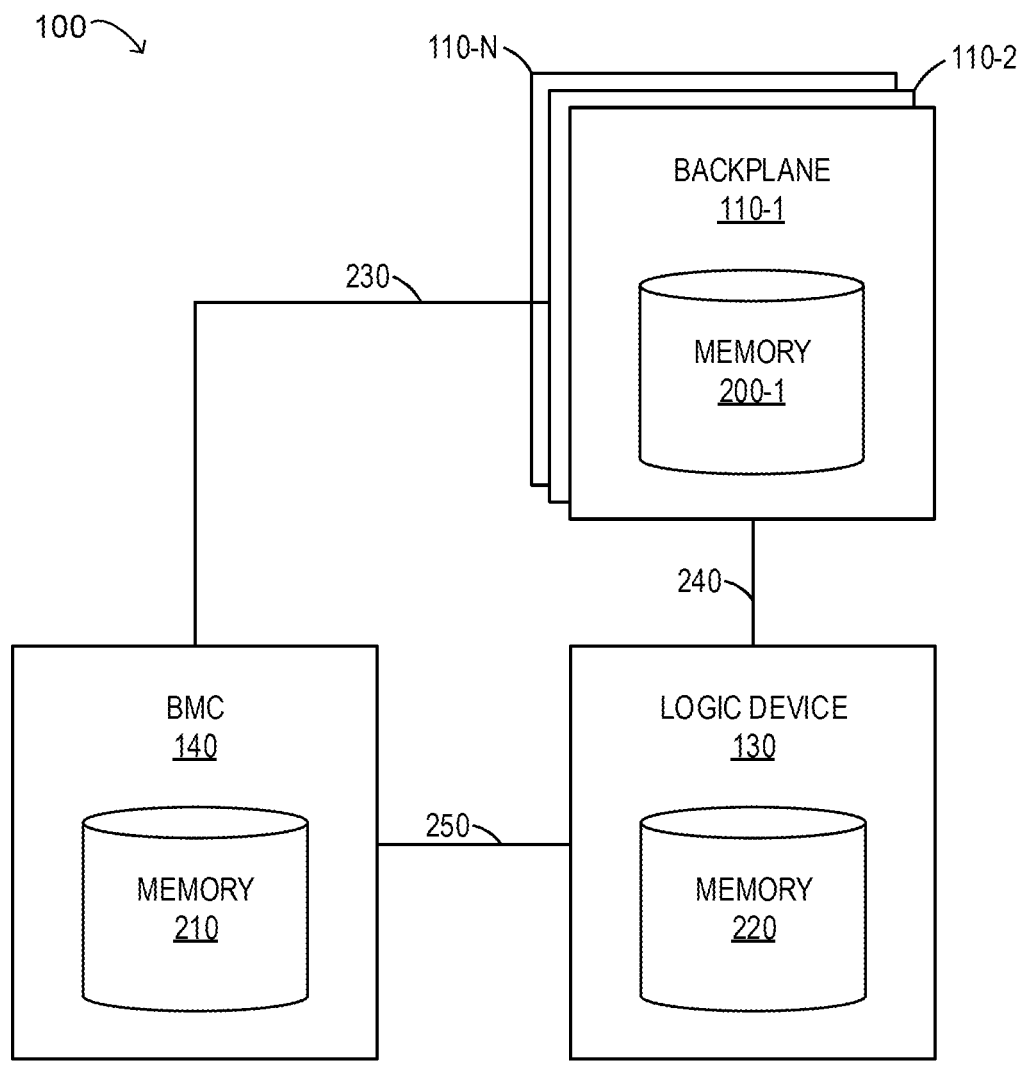
FIG. 2 is a block diagram of selected elements of an embodiment of an information handling system.

FIG. 2 is a block diagram of selected elements of an embodiment of an information handling system. In the embodiment illustrated in FIG. 2, information handling system 100 includes backplanes 110-1 through 110-N (generally referred to herein as "backplane 110"), BMC 140, and logic device 130. Each backplane 110-1 through 110-N may be of various sizes and/or dimensions with respect to one another and may each include a memory (generally referred to herein as "memory 200"). Specifically, backplane 110-1 may be or include a left front chassis backplane that includes memory 200-1, backplane 110-2 may be or include a rear chassis backplane that includes memory 200-2 (not shown in figure), and backplane 110-N may be or include a right front chassis backplane that includes memory 200-N (not shown in figure). In the embodiment illustrated in FIG. 2, each memory 200 may be or include a non-volatile memory medium used to store firmware instructions and logical identifiers (e.g., generated by BMC 140) corresponding to the backplane 110 in which memory 200 is located. BMC 140 may include memory 210 and logic device 130 may include shared memory 220. Both memory 210 and shared memory 220 may be or include a non-volatile memory medium used to store firmware instructions and logical identifiers.

As shown in FIG. 2, BMC 140 may be communicably coupled to each backplane 110 in information handling system 100 via bus 230. In one embodiment, bus 230 may be or include an inter-integrated circuit (I2C) bus. Similarly, BMC 140 may be communicably coupled to logic device 130 via bus 250. In one embodiment, bus 250 may be or include a serial peripheral interface (SPI) bus. Logic device 130 may be communicably coupled to each backplane 110 in information handling system 100 via bus 240. In one embodiment, bus 240 may be or include a 1-wire bus. In other embodiments, information handling system 100 may include additional, fewer, and/or different components than the embodiment illustrated in FIG. 2.

In one embodiment, each backplane 110-1 through 110-N of information handling system 100 may generate data, or "inventory information," used to indicate one or more attributes associated with backplanes 110. In particular, each backplane 110 may execute firmware instructions stored in memory 200 to generate inventory information. For example, each backplane 110 may generate inventory information that indicates a location of backplane 110 (e.g., within a chassis of information handling system 100), a type of backplane 110 (e.g., an active type, passive type, manufacturer, and the like), a geometry of backplane 110 (e.g., various dimensions of backplane 110 and/or drive slot configurations, cable connections, and the like), and/or other attributes that may be used for consistent logical identifier assignment, or enumeration, for respective backplanes 110. In the embodiment illustrated in FIG. 2, inventory information generated by each backplane 110-1 through 110-N may be sent to BMC 140 via bus 230 such that BMC 140 may use the inventory information to generate and/or assign logical identifiers to backplanes 110-1 through 110-N and/or the drive slots thereon.

In one embodiment, inventory information generated by backplanes 110-1 through 110-N may include a voltage, or a "unique voltage profile," associated with each backplane 110. In particular, backplanes 110-1 through 110-N may each identify a unique voltage profile associated with one or more components disposed, or otherwise installed, upon backplane 110. In this embodiment, backplanes 110-1 through 110-N may each execute firmware instructions (e.g., stored in memory 200) that may sample respective voltages of one or more circuits (e.g., one or more voltage divider circuits) disposed, or otherwise installed, upon backplane 110. For example, backplane 110-1 may execute firmware instructions stored in memory 200-1 that uses an analog-to-digital converter (ADC) of backplane 110-1 to sample voltages across one or more voltage divider circuits used to supply input voltages to one or more drive slots of backplane 110-1. In this example, backplane 110-1 may determine a unique voltage profile based on the sampled voltages. That is, the unique voltage profile associated with a particular backplane 110 may be a function of the one or more components disposed, or otherwise installed, upon the backplane 110. For example, the unique voltage profile for a particular backplane 110 may be or include a summation of respective voltages sampled within the backplane 110. In another example, the unique voltage profile may be or include an average of respective voltages sampled within the backplane 110. In yet another example, the unique voltage profile may be or include a median of respective voltages sampled within the backplane 110. In one embodiment, backplanes 110-1 through 110-N may each indicate a respective unique voltage profile in inventory information sent to BMC 140.

In one embodiment, backplanes 110-1 through 110-N may each identify a unique voltage profile associated with one or more electromechanical components disposed, or otherwise installed, upon backplane 110. In this embodiment, backplanes 110-1 through 110-N may each execute firmware instructions (e.g., stored in memory 200) that may sample respective voltages of one or more electromechanical circuits (e.g., relays, switches, and the like) disposed, or otherwise installed, upon backplane 110. For example, backplane 110-N may include two plunger type membrane switches (i.e., switches 1 and 2) disposed upon opposite portions or edges of backplane 110-N. Here, backplane 110-N may be comprised of dimensions configured to be inserted, or otherwise installed, within a left front chassis or a right front chassis of information handling system 100. In addition, the front chassis of information handling system 100 may include an extrusion on the left front chassis configured to depress switch 1 when backplane 110-N is inserted, or otherwise installed, within the left front chassis. Similarly, the front chassis may additionally include an extrusion on the right front chassis configured to depress switch 2 when backplane 110-N is inserted, or otherwise installed, within the right front chassis. That is, switch 1 may be closed, or otherwise engaged, when backplane 110-N is inserted, or otherwise installed, within the left front chassis (while switch 2 remains open) and switch 2 may be closed, or otherwise engaged, when backplane 110-N is inserted, or otherwise installed, within the right front chassis (while switch 1 remains open). In this example, backplane 110-N may execute firmware instructions stored in memory 200-N (not shown in figure) that uses an ADC of backplane 110-N to sample voltages across switch 1 and switch 2 to determine a unique voltage profile based on the sampled voltages. The unique voltage profile may indicate which, if any, switch has been depressed by the front chassis and, in turn, may indicate whether backplane 110-N was inserted, or otherwise installed, within the left front chassis or within the right front chassis. In one embodiment, backplanes 110-1 through 110-N may each indicate a respective unique voltage profile in inventory information sent to BMC 140. In another embodiment, backplanes 110-1 through 110-N may each map their unique voltage profile to a backplane location within information handling system 100 (e.g., based on sampled voltages across switches 1 and 2 as described above) and may indicate the backplane location in inventory information sent to BMC 140.

In one embodiment, backplanes 110-1 through 110-N may each identify a cable setup, or a "unique cable configuration," associated with each backplane 110. In particular, backplanes 110-1 through 110-N may each identify a unique cable configuration associated with one or more cable terminations disposed, or otherwise installed, upon backplane 110. In this embodiment, backplanes 110-1 through 110-N may each execute firmware instructions (e.g., stored in memory 200) that may sample respective voltages of one or more cable termination circuits (e.g., power supply cable termination, ethernet cable termination, and the like) disposed, or otherwise installed, upon backplane 110. For example, backplane 110-2 may execute firmware instructions stored in memory 200-2 (not shown in figure) that uses an ADC of backplane 110-2 to sample voltages across one or more cable termination circuits used to communicably couple backplane 110-2 to one or more cables of information handling system 100. In this example, backplane 110-2 may determine a unique cable configuration based on the sampled voltages. That is, the unique cable configuration associated with a particular backplane 110 may be a function of the one or more cable terminations disposed, or otherwise installed, upon the backplane 110. For example, the unique cable configuration for a particular backplane 110 may be or include a summation of respective voltages sampled within the backplane 110. In another example, the unique cable configuration may be or include an average of respective voltages sampled with the backplane 110. In yet another example, the unique cable configuration may be or include a summary of each cable termination (i.e., as indicated by a cable termination identifier) communicably coupled to a cable of information handling system 100. In one embodiment, backplanes 110-1 through 110-N may each indicate a respective unique cable configuration in inventory information sent to BMC 140. In another embodiment, backplanes 110-1 through 110-N may each map their unique cable configuration to a backplane location within information handling system 100 (e.g., based on sampled voltages across cable termination circuits as described above) and may indicate the backplane location in inventory information sent to BMC 140.

In one embodiment, BMC 140 may receive the inventory information from each backplane 110-1 through 110-N via bus 230 and may determine a location within information handling system 100 for each backplane 110-1 through 110-N, or a "backplane topology," based on the inventory information. In particular, BMC 140 may identify a unique voltage profile indicated in the inventory information received from each backplane 110-1 through 110-N and may map the unique voltage profile to a location for each backplane 110 to determine the backplane topology. In one embodiment, memory 210 of BMC 140 may be or include a relational database in which unique voltage profiles (e.g., specified in volts) and associated backplane locations (e.g., specified by respective chassis types) are stored as entries within a list. In this embodiment, BMC 140 may identify the unique voltage profile indicated in inventory information, locate the unique voltage profile entry within the list, and may identify the backplane location mapped to the unique voltage profile as indicated in the list. In another embodiment, each unique voltage profile value may be of an enumerated (enum) data type specifying a numeric enum value. In this embodiment, BMC 140 may use the numeric enum value specified by the unique voltage profile to identify a backplane location within information handling system 100 having a corresponding numeric enum value.

In one embodiment, BMC 140 may determine a location within information handling system 100 for each backplane 110-1 through 110-N based on a unique cable configuration indicated in inventory information. In particular, BMC 140 may identify the unique cable configuration received from each backplane 110-1 through 110-N and may map the unique cable configuration to a location for each backplane 110 to determine a backplane topology. In one embodiment, BMC 140 may execute firmware instructions stored in memory 210 that define a set of rules used to map the unique cable configuration to a location for each backplane 110. For example, the set of rules may indicate that for a unique cable configuration in which cable terminations 1, 2, and 3 of backplane 110-1 are each communicably coupled to a cable of information handling system 100, backplane 110-1 may be inserted, or otherwise installed, within a left front chassis of information handling system 100. Similarly, the set of rules may indicate that for a unique cable configuration in which cable terminations 4, 5, and 6 of backplane 110-1 are each communicably coupled to a cable, backplane 110-1 may be inserted, or otherwise installed, within a right front chassis of information handling system 100. In one embodiment, memory 210 of BMC 140 may be or include a relational database in which unique cable configurations (e.g., specified by cable termination identifiers) and associated backplane locations (e.g., specified by respective chassis types) are stored as entries within a list. In this embodiment, BMC 140 may identify the unique cable configuration indicated in inventory information, locate the unique cable configuration entry within the list, and may identify the backplane location mapped to the unique cable configuration as indicated in the list.

Upon determining the backplane topology of information handling system 100, BMC 140 may generate a logical backplane identifier for each backplane 110-1 through 110-N based on the backplane topology. Once generated, BMC 140 may assign the logical backplane identifiers to backplanes 110-1 through 110-N accordingly. In one embodiment, BMC 140 may assign the logical backplane identifiers to backplanes 110-1 through 110-N by storing the respective logical backplane identifiers in memory 200-1 through 200-N. For example, each memory 200-1 through 200-N may set a flag indicating that the respective backplanes 110-1 through 110-N are ready to receive the logical backplane identifiers. BMC 140 may identify the flag indicating that the respective backplanes 110-1 through 110-N are ready and may store the respective logical backplane identifiers in memory 200-1 through 200-N. In addition, BMC 140 may determine locations for each drive slot within respective backplanes 110, or a "drive slot topology," based on inventory information as described above. Here, BMC 140 may generate and/or assign logical drive slot identifiers to drive slots based on the drive slot topology. In particular, BMC 140 may determine a drive slot topology for each backplane 110-1 through 110-N based on the inventory information received from each backplane 110 and may generate a logical drive slot identifier for each drive slot within respective backplanes 110 based on the drive slot topology. Once generated, BMC 140 may assign the logical drive slot identifiers to drive slots within backplanes 110-1 through 110-N accordingly. In one embodiment, BMC 140 may assign the logical drive slot identifiers to drive slots within respective backplanes 110-1 through 110-N by storing the respective logical drive slot identifiers in memory 200-1 through 200-N. For example, each memory 200-1 through 200-N may set a flag indicating that the respective backplanes 110-1 through 110-N are ready to receive the logical drive slot identifiers. BMC 140 may identify the flag indicating that the respective backplanes 110-1 through 110-N are ready and may store the respective logical drive slot identifiers in memory 200-1 through 200-N. In another embodiment, BMC 140 may send the generated logical identifiers (i.e., logical backplane identifiers and/or logical drive slot identifiers) to logic device 130 via bus 250 such that logic device 130 may store the logical identifiers in shared memory 220 as described above with respect to FIG. 1. Once stored in shared memory 220, backplanes 110-1 through 110-N may retrieve the logical identifiers from shared memory 220 of logic device 130 via bus 240.

Figure 3:
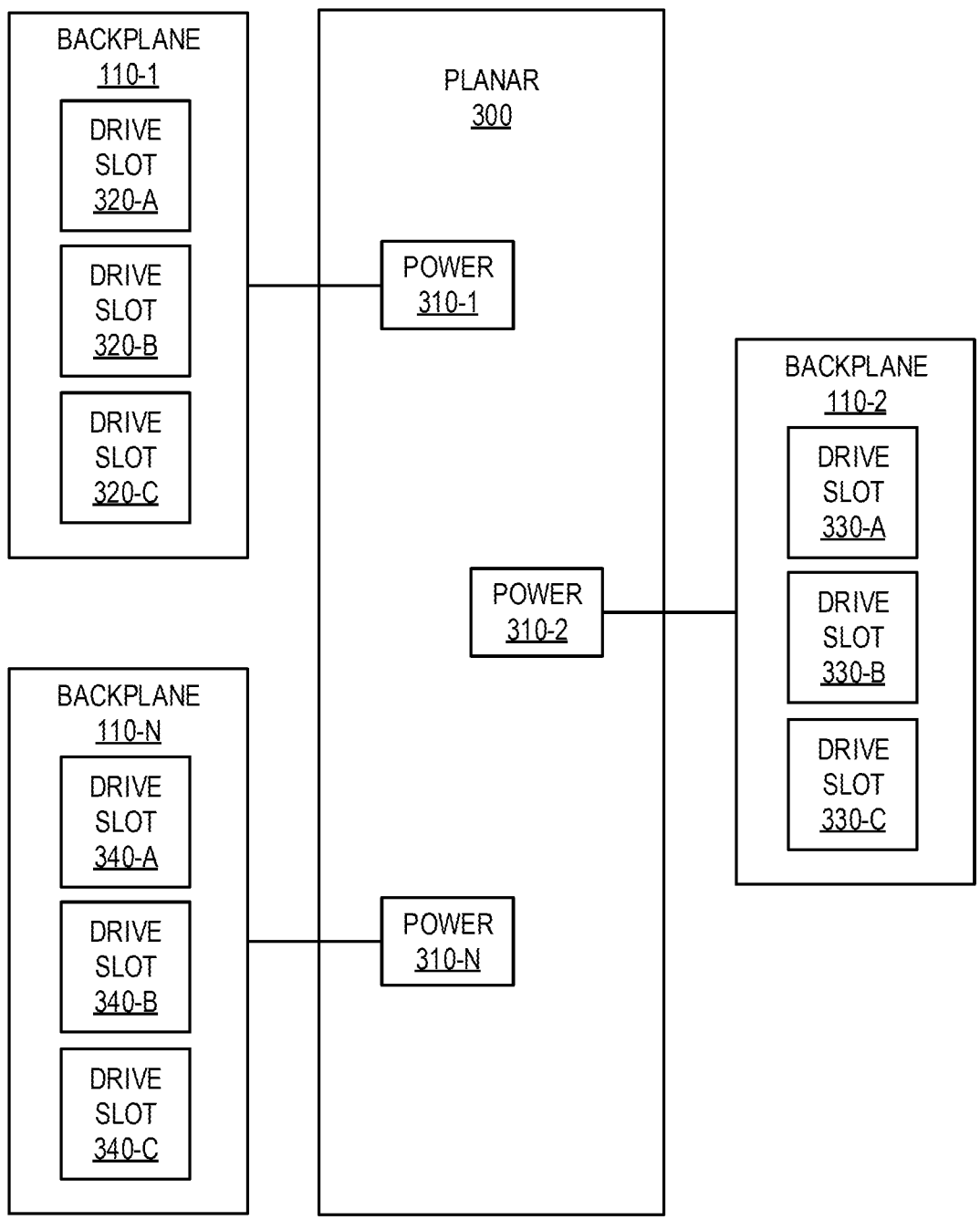
FIG. 3 is a block diagram of selected elements of an embodiment of a planar of an information handling system.

FIG. 3 is a block diagram of selected elements of an embodiment of a planar of an information handling system. In the embodiment illustrated in FIG. 3, planar 300 may be or include a motherboard of information handling system 100 comprised of processor subsystem 120, memory subsystem 150, I/O subsystem 160, local storage resource 170, and/or network interface 180 shown in FIG. 1. As shown in FIG. 3, planar 300 includes power ports 310-1 through 310-N (collectively referred to herein as "power ports 310"). Each power port 310 may be communicably coupled to a backplane 110 of information handling system 100. Specifically, power port 310-1 may be communicably coupled to backplane 110-1, power port 310-2 may be communicably coupled to backplane 110-2, and power port 310-N may be communicably coupled to backplane 110-N. In other embodiments, planar 300 may additionally include system BIOS, one or more complementary metal-oxide semiconductor (CMOS) batteries, storage device connectors, one or more expansion cards, and/or any other components suitable for performing one or more operations on a motherboard of information handling system 100.

As described above with respect to FIG. 2, BMC 140 may generate and/or assign a logical backplane identifier for each backplane 110-1 through 110-N based on a backplane topology. In one embodiment, each logical backplane identifier assigned to backplanes 110 may correspond to a location of backplane 110 within information handling system 100 (e.g., within a chassis of information handling system 100) and/or position of backplane 110 with respect to one or more adjacent backplanes 110. For example, each logical backplane identifier may be or include a backplane bay number that sequentially increments, or decrements, in numeric value for respective backplanes 110 within a front chassis of information handling system 100. In the example illustrated in FIG. 3, backplane 110-1 may be or include a left front chassis backplane and, given this location, may be assigned a logical backplane identifier of 1. Similarly, backplane 110-N may be or include a right front chassis backplane and, based on the adjacent location to backplane 110-1 within the front chassis, may be assigned a logical backplane identifier of 2. Lastly, backplane 110-2 may be or include a back chassis backplane and, given this opposite location from backplanes 110-1 and 110-N, may be assigned a logical backplane identifier of 0. Here, each backplane 110-1 through 110-N may be identified and/or addressed by one or more components of information handling system 100 using the logical backplane identifier that corresponds to the backplane 110. In this way, backplanes 110-1 through 110-N may be consistently identified and/or addressed by the one or more components using the logical backplane identifiers rather than using conventional generic identifiers that may require hardcoding in firmware instructions and/or include nonsequential identifiers (e.g., based on power port 310 numbers).

Similarly, BMC 140 may generate and/or assign a logical drive slot identifier for each drive slot within respective backplanes 110-1 through 110-N based on a drive slot topology for each backplane 110. In one embodiment, each logical drive slot identifier assigned to drive slots disposed upon backplane 110 may correspond to respective locations of drive slots within backplane 110 and/or positions of drive slots within one or more one or more adjacent backplanes 110. For example, each logical drive slot identifier may be or include a drive slot number that sequentially increments, or decrements, in numeric value for respective drive slots within backplane 110 and/or in relation to positions of drive slots within an adjacent backplane 110 installed within the same chassis. In the example illustrated in FIG. 3, because backplane 110-1 may be or include a left front chassis backplane, backplane 110-1 may be assigned a logical backplane identifier of 1 as described above. Additionally, backplane 110-N may be assigned a logical backplane identifier of 2 based on the adjacent location to backplane 110-1 within the front chassis. Therefore, drive slots 320-A through 320-C of backplane 110-1 may be assigned respective logical drive slot identifiers of 0, 1, and 2 and drive slots 340-A through 340-C of backplane 110-N may be assigned respective logical drive slot identifiers of 3, 4, and 5. In this example, each logical drive slot identifier may be assigned by BMC 140 based on, both, respective locations of drive slots within each backplane 110 and positions of drive slots within adjacent backplanes 110 (i.e., an offset). Given the opposite location from backplanes 110-1 and 110-N, drive slots 330-A through 330-C of backplane 110-2 may be assigned respective logical drive slot identifiers of 0, 1, and 2. Here, each drive slot disposed upon backplane 110 may be identified and/or addressed by one or more components of information handling system 100 using the logical drive slot identifier that corresponds to the drive slot. In this way, drive slots may be consistently identified and/or addressed by the one or more components using the logical drive slot identifiers rather than using conventional generic identifiers that may require hardcoding in firmware instructions.

Figure 4:
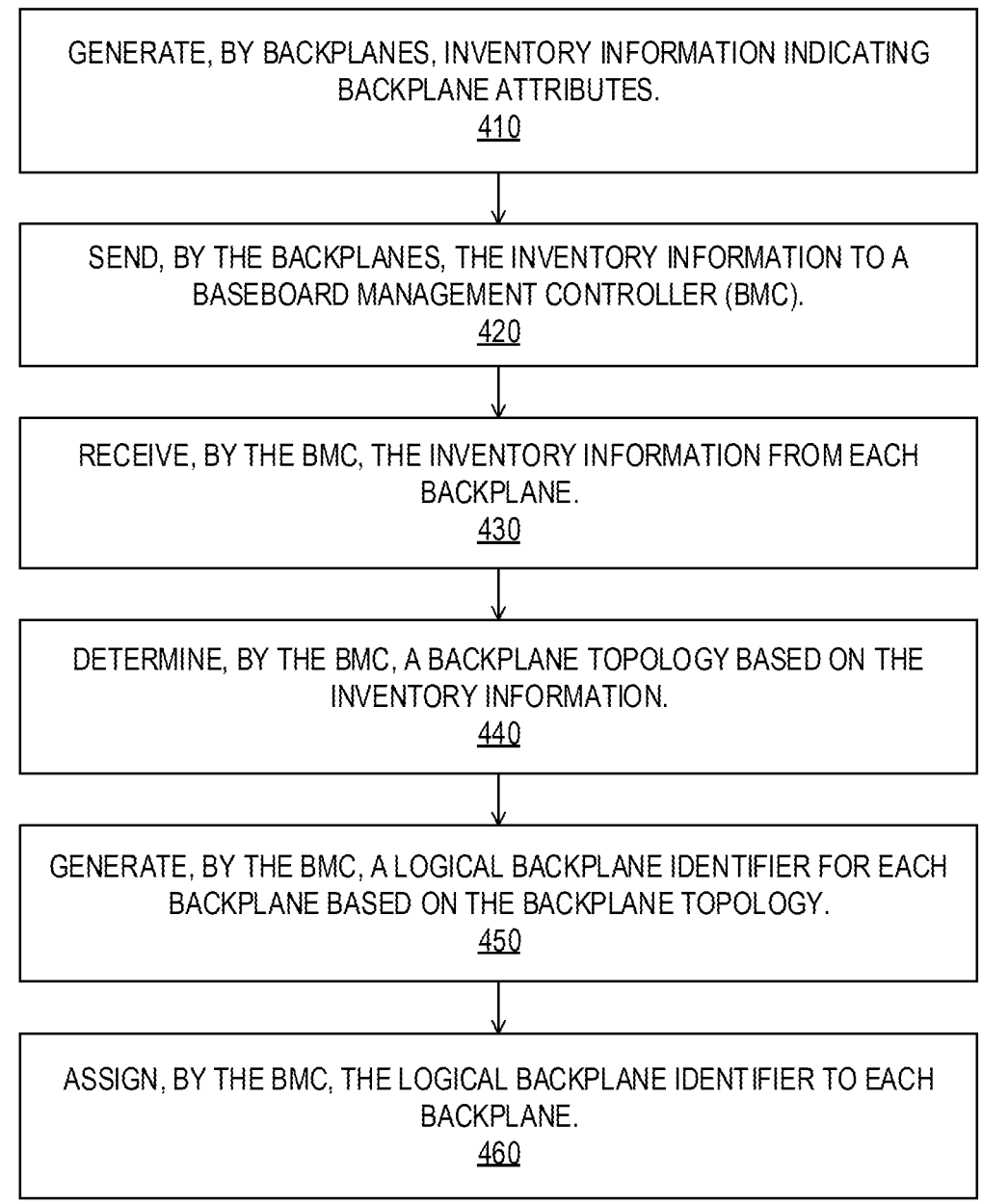
FIG. 4 is a flowchart depicting selected elements of an embodiment of a method for enumerating logical identifiers for a plurality of backplanes of an information handling system.

FIG. 4 is a flowchart depicting selected elements of an embodiment of a method for enumerating logical identifiers for a plurality of backplanes of an information handling system. It is noted that certain operations described in method 400 may be optional or may be rearranged in different embodiments.

Method 400 may begin at step 410, where each of the plurality of backplanes may generate inventory information indicating backplane attributes. For example, each backplane 110 may generate inventory information that indicates a location of backplane 110 (e.g., within a chassis of information handling system 100), a type of backplane 110 (e.g., an active type, passive type, manufacturer, and the like), a geometry of backplane 110 (e.g., various dimensions of backplane 110 and/or drive slot configurations, cable connections, and the like), and/or other attributes that may be used for consistent logical identifier assignment, or enumeration, for respective backplanes 110 as described above with respect to FIG. 2. In steps 420 and 430, each of the plurality of backplanes may send the inventory information to a baseboard management controller (BMC) of the information handling system and the BMC may receive the inventory information from each of the plurality of backplanes. For example, inventory information generated by each backplane 110-1 through 110-N may be sent to BMC 140 via bus 230 such that BMC 140 may use the inventory information to generate and/or assign logical identifiers to backplanes 110-1 through 110-N and/or the drive slots thereon as described above with respect to FIG. 2. In step 440, the BMC may determine a backplane topology of the information handling system based on the inventory information. The backplane topology may indicate a backplane location within information handling system for each of the plurality of backplanes. For example, BMC 140 may identify a unique voltage profile indicated in the inventory information received from each backplane 110-1 through 110-N and may map the unique voltage profile to a location for each backplane 110 to determine the backplane topology as described above with respect to FIG. 2. In another example, BMC 140 may identify a unique cable configuration received from each backplane 110-1 through 110-N and may map the unique cable configuration to a location for each backplane 110 to determine a backplane topology as described above with respect to FIG. 2. In steps 450 and 460, the BMC may generate a logical backplane identifier for each of the plurality of backplanes based on the backplane topology and may assign the logical backplane identifier to each of the plurality of backplanes. Each of the plurality of backplanes may have a logical backplane identifier. For example, BMC 140 may generate and/or assign a logical backplane identifier for each backplane 110-1 through 110-N based on a backplane topology where each logical backplane identifier assigned to backplanes 110 may correspond to a location of backplane 110 within information handling system 100 (e.g., within a chassis of information handling system 100) and/or position of backplane 110 with respect to one or more adjacent backplanes 110 as described above with respect to FIG. 3.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method for enumerating logical identifiers for a plurality of backplanes of an information handling system, the method comprising:
    generating, by each of the plurality of backplanes, inventory information indicating a plurality of backplane attributes, the generating comprising:
        sampling, by each of the plurality of backplanes, a voltage associated with one or more components of each of the plurality of backplanes;
        determining, by each of the plurality of backplanes, a unique voltage profile for each of the plurality of backplanes based on the voltage; and
        indicating, by each of the plurality of backplanes, the unique voltage profile for each of the plurality of backplanes in the inventory information; and
    sending, by each of the plurality of backplanes, the inventory information to a baseboard management controller (BMC) of the information handling system;
    receiving, by the BMC, the inventory information from each of the plurality of backplanes;
    determining, by the BMC, a backplane topology of the information handling system based on the inventory information, the backplane topology indicating a backplane location within the information handling system for each of the plurality of backplanes;
    generating, by the BMC, a logical backplane identifier for each of the plurality of backplanes based on the backplane topology; and
    assigning, by the BMC, the logical backplane identifier to each of the plurality of backplanes, each of the plurality of backplanes having a logical backplane identifier.

2. The method of claim 1, further comprising:
    mapping, by each of the plurality of backplanes, the unique voltage profile for each of the plurality of backplanes to the backplane location; and
    indicating, by each of the plurality of backplanes, the backplane location in the inventory information.

3. The method of claim 1, wherein determining the backplane topology of the information handling system based on the inventory information comprises:
    mapping, by the BMC and for each of the plurality of backplanes, the unique voltage profile for each of the plurality of backplanes to the backplane location.

4. The method of claim 1, further comprising:
    determining, by the BMC, a drive slot topology for each of the plurality of backplanes based on the inventory information, the drive slot topology indicating a plurality of drive slot locations for each of the plurality of backplanes;
    generating, by the BMC, a logical drive slot identifier for each of the plurality of drive slots based on the drive slot topology; and
    assigning, by the BMC, the logical drive slot identifier to each of the plurality of drive slots, each of the plurality of drive slots having a logical drive slot identifier.

5. One or more computer-readable non-transitory storage media embodying software that is operable when executed to:
    generate, by each of a plurality of backplanes of an information handling system, inventory information indicating a plurality of backplane attributes, wherein to generate the inventory information, the software is further operable when executed to:
        sample, by each of the plurality of backplanes, a voltage associated with one or more components of each of the plurality of backplanes;
        determine, by each of the plurality of backplanes, a unique voltage profile for each of the plurality of backplanes based on the voltage; and
        indicate, by each of the plurality of backplanes, the unique voltage profile for each of the plurality of backplanes in the inventory information; and
    send, by each of the plurality of backplanes, the inventory information to a baseboard management controller (BMC) of the information handling system;
    receive, by the BMC, the inventory information from each of the plurality of backplanes;
    determine, by the BMC, a backplane topology of the information handling system based on the inventory information, the backplane topology indicating a backplane location within the information handling system for each of the plurality of backplanes;
    generate, by the BMC, a logical backplane identifier for each of the plurality of backplanes based on the backplane topology; and
    assign, by the BMC, the logical backplane identifier to each of the plurality of backplanes, each of the plurality of backplanes having a logical backplane identifier.

6. The media of claim 5, wherein the software is further operable when executed to:
    map, by each of the plurality of backplanes, the unique voltage profile for each of the plurality of backplanes to the backplane location; and
    indicate, by each of the plurality of backplanes, the backplane location in the inventory information.

7. The media of claim 5, wherein to determine the backplane topology of the information handling system based on the inventory information, the software is further operable when executed to:
    map, by the BMC and for each of the plurality of backplanes, the unique voltage profile for each of the plurality of backplanes to the backplane location.

8. The media of claim 5, wherein the software is further operable when executed to:
    determine, by the BMC, a drive slot topology for each of the plurality of backplanes based on the inventory information, the drive slot topology indicating a plurality of drive slot locations for each of the plurality of backplanes;
    generate, by the BMC, a logical drive slot identifier for each of the plurality of drive slots based on the drive slot topology; and assign, by the BMC, the logical drive slot identifier to each of the plurality of drive slots, each of the plurality of drive slots having a logical drive slot identifier.

9. A computing environment, comprising:

an information handling system including one or more processors; and one or more computer-readable non-transitory storage media coupled to one or more of the processors and comprising instructions operable when executed by one or more of the processors to cause the system to:

generate, by each of a plurality of backplanes of an information handling system, inventory information indicating a plurality of backplane attributes, wherein to generate the inventory information, the processors are further operable when executed to:

sample, by each of the plurality of backplanes, a voltage associated with one or more components of each of the plurality of backplanes;

determine, by each of the plurality of backplanes, a unique voltage profile for each of the plurality of backplanes based on the voltage; and indicate, by each of the plurality of backplanes, the unique voltage profile for each of the plurality of backplanes in the inventory information; and send, by each of the plurality of backplanes, the inventory information to a baseboard management controller (BMC) of the information handling system;

receive, by the BMC, the inventory information from each of the plurality of backplanes;

determine, by the BMC, a backplane topology of the information handling system based on the inventory information, the backplane topology indicating a backplane location within the information handling system for each of the plurality of backplanes;

generate, by the BMC, a logical backplane identifier for each of the plurality of backplanes based on the backplane topology; and assign, by the BMC, the logical backplane identifier to each of the plurality of backplanes, each of the plurality of backplanes having a logical backplane identifier.

10. The computing environment of claim 9, wherein the processors are further operable when executed to:

map, by each of the plurality of backplanes, the unique voltage profile for the backplane to the backplane location; and indicate, by each of the plurality of backplanes, the backplane location in the inventory information.

11. The computing environment of claim 9, wherein to determine the backplane topology of the information handling system based on the inventory information, the processors are further operable when executed to:

map, by the BMC and for each of the plurality of backplanes, the unique voltage profile for each of the plurality of backplanes to the backplane location.

* * * * *